United States Patent [19]

Huston et al.

[11] 3,733,612

[45] May 15, 1973

[54] SIGNATURE REPRODUCTION

[75] Inventors: Harvey L. Huston, Silver Spring, Md.; Donald K. Belcher, Gainesville, Fla.

[73] Assignee: Signa-Signer, Inc., Silver Spring, Md.

[22] Filed: Mar. 30, 1971

[21] Appl. No.: 129,462

[52] U.S. Cl. ............346/33 MC, 318/568, 346/74 M

[51] Int. Cl. ............G11b 31/00

[58] Field of Search ............346/33 M, 33 MC, 346/74 M; 318/568, 678, 663, 607

[56] References Cited

UNITED STATES PATENTS 3,425,140 2/1969 Dillon et al. ............35/36

3,582,956 6/1971 Huston et al. ............346/33 MC

*Primary Examiner*—Joseph W. Hartary
*Attorney*—John J. Byrne

[57] ABSTRACT

The position of a pen or stylus with respect to a piece of paper is converted into two DC signals in a pair of potentiometers which are mechanically linked to the pen support mechanism. The DC signals are then converted into AC signals which are recorded on magnetic tape. When the tape is played back, the AC signals are reconverted into DC voltages which drive a negative feedback servomechanism system and thereby reproduce a signature previously recorded on the magnetic tape.

9 Claims, 2 Drawing Figures

Figure 2:
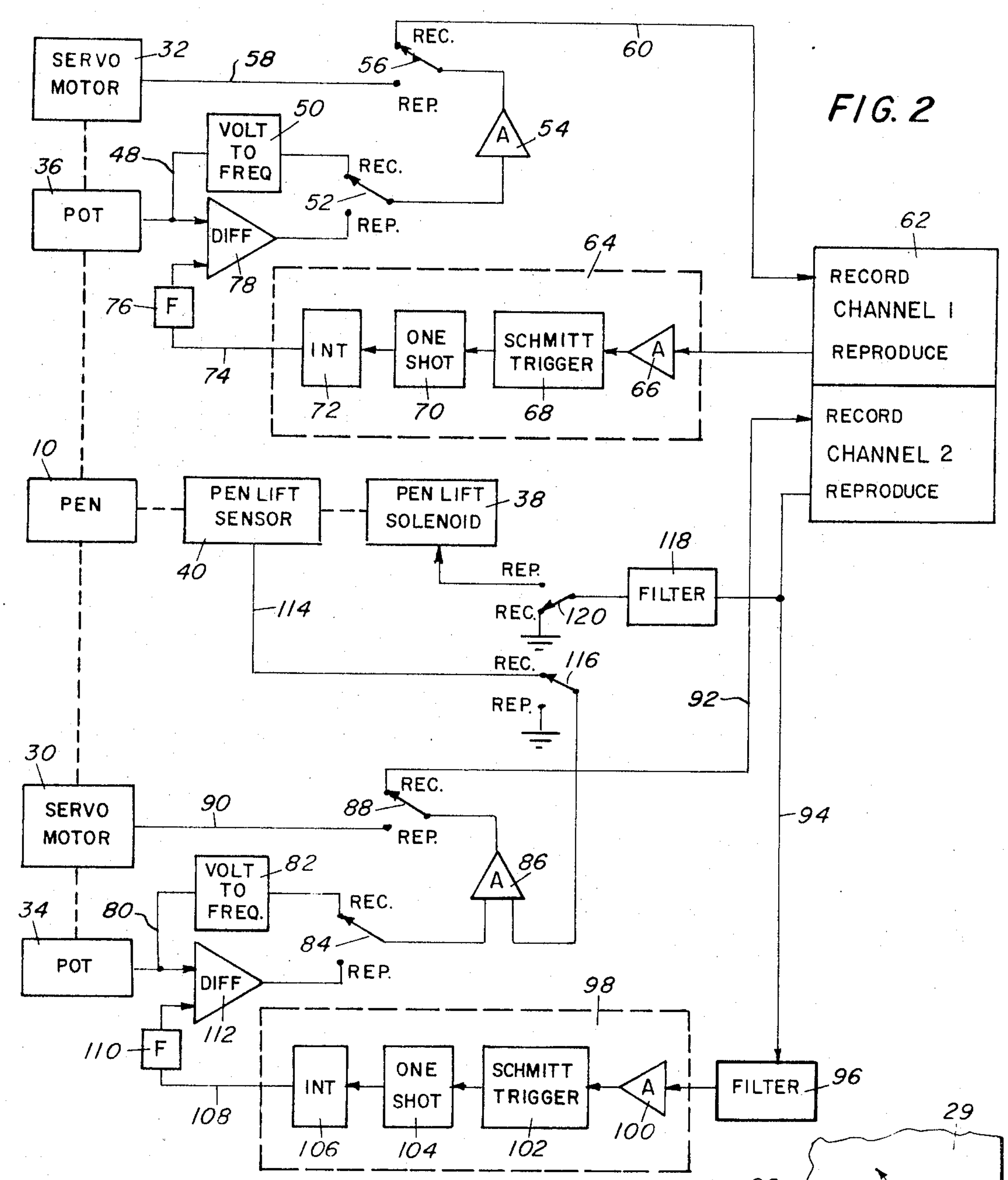

INVENTORS
HARVEY L. HUSTON
DONALD K. BELCHER
BY John J. Byrne
ATTORNEY

SIGNATURE REPRODUCTION

BACKGROUND OF THE INVENTION

1. Field of the Invention

This invention relates to reproducing machines and more particularly to machines for reproducing handwriting and signatures.

2. Description of the Prior Art

Businessmen, public officials, and others who constantly deal with large numbers of people are frequently faced with the time consuming task of signing a large volume of correspondence. The only alternative to signing each piece of correspondence individually is either to use a signature stamp or to dispense with a handwritten signature altogether. Signatures reproduced with a stamp are easily detectable, and the omission of any signature whatsoever diminishes the personal nature of a letter. As a result, many businessmen and public officials spend an undue amount of time in this routine signature task.

Many attempts have been made to develop a machine capable of reproducing a signature. In general, the quality of signatures produced by such machines has been poor, and they are easily identifiable as automatic reproductions. In addition, such machines have been unable to write messages of substantial length, to add a postscript to a letter, or to sign checks or stock certificates.

Accordingly, it is an object of this invention to provide a machine for accurately reproducing a handwritten signature.

It is another object of this invention to provide a machine which is capable of writing and signing entire letters and memoranda.

It is another object of this invention to provide a machine which reproduces a number of copies of a signature with the normal variations inherent in handwriting.

It is another object of this invention to provide a machine which records a signature on magnetic tape and reproduces it by means of a negative feedback servomechanism system.

These and other objects are attained in an illustrative signature reproducing machine wherein information relating to a signature is recorded on magnetic tape and played back to drive a stylus or pen when it is desired to reproduce the signature. Initially, the signature is recorded on tape by writing it manually with the stylus while the machine is in the record mode. As the signature is written, the position of the pen is converted into two DC signals by two potentiometers which are connected to the pen support mechanism. These DC signals are then converted into frequency signals and recorded in separate channels of a magnetic tape recorder. To reproduce the signature, the frequency signals previously recorded on the tape are played back and reconverted into DC signals which are sent to a differential amplifier. In the differential amplifier the recorded DC signals are compared with the output of the potentiometers, and the output error signals are sent to servo motors. The servo motors, which are mechanically connected both to the potentiometers and to the pen support mechanism, drive the pen until the output of the potentiometers matches the recorded DC signal, to which time the error signals are zero. Thus the recorded signature is reproduced by means of a negative feedback system.

An additional signal indicating whether the pen is in contact with the paper is recorded in one channel of the tape recorder simultaneously with the signals from the potentiometers. This signal is filtered out during playback and delivered to a solenoid which is connected to a mechanism for lifting the pen from the surface of the paper.

Figure 1:
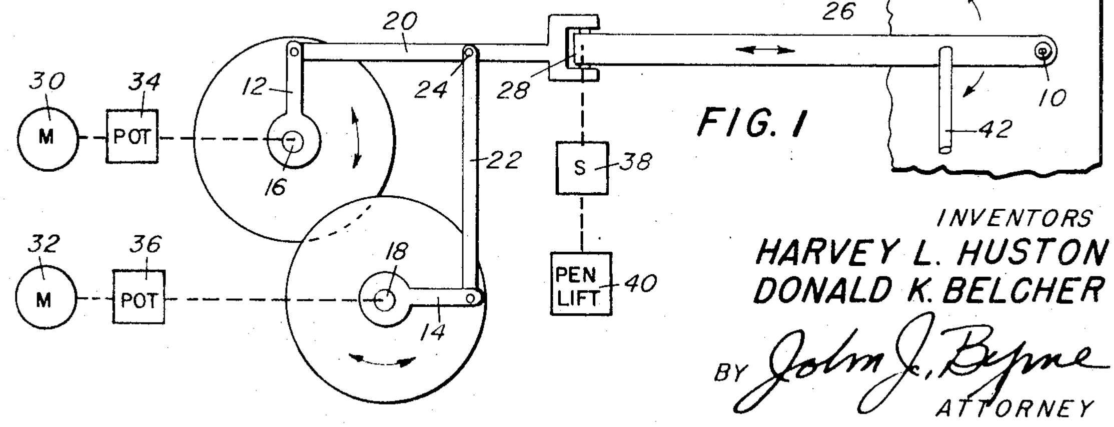

The operation and advantages of a signature reproducing machine constructed in accordance with this invention will be better understood by reference to the drawing, in which:

FIG. 1 shows schematically the pen support mechanism for a signature reproducing machine constructed in accordance with this invention; and FIG. 2 is a schematic diagram showing the control circuitry for a machine constructed in accordance with this invention.

A top view of the mechanism employed to hold and control a pen 10 is shown in FIG. 1. Arms 12 and 14 rotate about fixed shafts 16 and 18, respectively, and are connected pivotally to links 20 and 22, respectively. The other end of link 22 is connected pivotally to link 20 by pin 24. The other end of link 20 is connected to writing arm 26 by means of pin 28, which permits writing arm 26 to pivot in a vertical direction, thereby lifting pen 10 from the surface of the paper 29 on which a signature is to be written.

Shafts 16 and 18 are rotated by servo motors 30 and 32, respectively, which are shown schematically in FIG. 1. Also affixed to shafts 16 and 18 are potentiometers 34 and 36, respectively, which deliver DC output voltages which are representative of the angular displacement of shafts 16 and 18. Advantageously, potentiometers 34 and 36 are of the conductive plastic variety and have infinite resolution.

Writing arm 26 is pivoted on pin 28 to lift pen 10 by means of a solenoid 38 shown schematically in FIG. 1. Pen lift sensing device 40 is also associated with arm 26 and delivers an output indicative of whether pen 10 is in contact with paper 29.

A pen holder 42 is fitted into pen 10 such that when the machine is in the record mode, as described below, a signature may be written manually with pen 10. When the machine is in the reproduce mode, holder 42 is detached from pen 10, and pen 10 is controlled by the operation of the pen support mechanism described above.

FIG. 2 shows the control circuitry for a signature reproducing machine in accordance with this invention. Similarly numbered components, such as motors 30 and 32, potentiometers 34 and 36, pin 10, pen lift sensing device 40, and solenoid 38, are identical to those shown in FIG. 1. Although the links among these components are shown schematically in FIG. 2, it is understood that they are actually connected as shown in FIG. 1 and as described above.

The output terminal of potentiometer 36, which, as indicated above, delivers a voltage representative of the angular displacement of shaft 18, is connected through line 48 to voltage-to-frequency converter 50. Converter 50 converts a DC voltage into an AC signal whose frequency is representative of the magnitude of the DC voltage. Illustratively, a model No. 5329 converter manufactured by Optical Electronics, Inc. may be used. The output of converter 50 is connected to the record terminal of double throw switch 52, which, like all switches shown in FIG. 2, has a record terminal and a reproduce terminal. The blade of switch 52 is connected through amplifier 54 to the blade of switch 56. The reproduce terminal of switch 56 is connected via line 58 to the input of motor 32, and the record terminal of switch 56 is connected through line 60 to the recording terminal of channel I in tape recorder 62, which is a standard stereo magnetic tape recorder.

The reproduce or playback terminal of channel I is connected to the input of a demodulation unit 64, which includes, connected in series, buffer amplifier 66, Schmitt trigger 68, one shot multivibrator 70, and integrator 72. The output of demodulator 64 is connected via line 74 to filter 76 and then to an input terminal of differential amplifier 78. The other input terminal of differential amplifier 78 is connected to line 48, and the output terminal of differential amplifier 78 is connected to the reproduce terminal of double throw switch 52.

This completes the circuitry which records the position of and controls shaft 18. The circuitry associated with shaft 16 is similar to that just described with slight modification. Potentiometer 34 is connected via line 80 to voltage-to-frequency converter 82, which is identical to converter 50. Converter 82 is connected to the record terminal of switch 84, the blade of switch 84 being connected to amplifier 86, which has dual inputs. The output of amplifier 86 is connected to the blade of switch 88. The reproduce terminal of switch 88 is connected via line 90 to the input of motor 30, and the record terminal of switch 88 is connected via line 92 to the recording input of channel II in tape recorder 62.

The reproduce or playback terminal of channel II in tape recorder 62 communicates through line 94 to filter 96, described below, and demodulation unit 98, which is identical to demodulation unit 64 and contains buffer amplifier 100, Schmitt trigger 102, one shot multivibrator 104, and integrator 106, each being identical to the corresponding component of demodulation unit 64. The output terminal of demodulation unit 98 connects via line 108 with filter 110, identical to filter 76, and then to one input of differential amplifier 112, identical to differential amplifier 78. The other input to differential amplifier 112 is connected to line 80, and the output of differential amplifier 112 is connected to the reproduce terminal of switch 84.

Pen lift sensing device is connected over line 114 through grounded double throw switch 116 to an input of amplifier 86. Thus the signal arriving on line 114 is combined in amplifier 86 with the signal coming through switch 84 and (if the machine is in the record mode) delivered via switch 88 and line 92 to the record terminal of channel II in tape recorder 62. Line 94, leading from the reproduce terminal of channel II, is connected through filter 118, described below, to the reproduce terminal of switch 120, the record terminal of which is grounded. The blade of switch 120 is connected to the input terminal of solenoid 38.

The signals produced by voltage-to-frequency converter 82 and pen lift sensing unit are both amplified in amplifier 86 and recorded in channel II of tape recorder 62. As a result, during reproduction the signals must be separated after they are played back from channel II. Thus, filter 118 is designed to pass signals of a frequency produced by pen lift sensing device 40 and filter 96 is designed to pass signals in the range produced by voltage-to-frequency converter 82.

The operation of the machine will now be described. Initially, the signature is "recorded" on magnetic tape in tape recorder 62 by writing it manually using pen holder 42 while the machine is in the record mode, that is, with all switches in the condition shown in FIG. 2 and tape recorder 62 in its record state.

Since signals are recorded in a similar manner in channel I and channel II of tape recorder 62, only the operation of channel I will be described. As pen 10 traces the signature to be reproduced, arm 14 rotates about shaft 18 such that the output of potentiometer 36 is varied. The output of potentiometer 36, a DC voltage, is delivered via line 48 to voltage-to-frequency converter 50. Voltage-to-frequency converter 50 generates an AC signal whose frequency is proportional to the magnitude of the DC signal from potentiometer 36 on line 48. This AC signal passes through switch 52 and is amplified by amplifier 54 before being transmitted through switch 56 and over line 60 to the record terminal in channel I. Thus a frequency signal representing one coordinate of the position of pen 10 is recorded in channel I of tape recorder 62 while the machine is in its record mode.

Another signal representing the other coordinate of pen 10 is recorded in a similar manner in channel II of tape recorder 62. In addition, pen lift sensing mechanism 40 delivers an AC signal on line 114 when pen 10 is in contact with paper 29. This signal, which is outside The range of frequencies produced by voltage-to-frequency converter 82, is delivered to the input of amplifier 86, and after amplification, is sent through switch 88 to be recorded in channel II of tape recorder 621

After the signature has been "recorded," all switches shown in FIG. 2 are thrown to their reproduce condition. Tape recorder 62 is switched to its playback state, and the signals previously recorded are played back. These signals appear at the reproduce terminals of channels I and II. The signal at the reproduce terminal of channel I is delivered to the input terminal of demodulation unit 64. In demodulation unit 64 the signal is amplified in buffer amplifier 66 and sent to Schmitt trigger 68, which provides a square wave output for every cycle of the signal arriving from amplifier 66. One shot multivibrator 70 generates a voltage spike at the leading edge of each square wave produced by Schmitt trigger 68. Finally, integrator 72 delivers a DC output on line 74 which varies in proportion to the frequency of the signals played back on channel I of tape recorder 62. A bias control (not shown) in integrator 72 is used to adjust the level of the DC signal produced therein such that it is at the same level as the DC signal originally produced in potentiometer 36 and recorded in tape recorder 62.

The DC signal produced by demodulation unit 64 is sent through filter 76, where all remaining ripples are removed, to one input of differential amplifier 78. The other input of differential amplifier 78 is connected to potentiometer 36. The output of differential amplifier 78 is thus the difference in magnitude between signals produced by potentiometer 36 and demodulation unit 64 and is the error signal in a negative feedback system. The error signal output of differential amplifier 78 is sent through switch 52, amplifier 54, and switch 56 to the input of servo motor 32. Accordingly, as in a normal negative feedback arrangement, motor 32 drives shaft 18 to the position where the error signal output of differential amplifier 78 is zero, that is, where the shaft 18 is in a position corresponding to the frequency of the signal recorded in tape recorder 62.

A similar process takes place in the circuitry associated with channel II. The signal played back in channel II, however, is filtered in filters 96 and 118 such that components of the signal relating to the vertical and horizontal position of pen 10 are separated. Thus, as described above, frequencies produced by voltage-to-frequency converter 82 are passed by filter 96, and the frequency produced by pen lift sensing device 40 is passed by filter 118.

The signal passing through filter 118 is sent through switch 120 to solenoid 38. If the frequency signal produced by pen lift sensing device 40 is present, Solenoid 40 maintains pen 10 in contact with paper 29; otherwise, as when pen 10 is between words or dotting an *i* or crossing a *t*, no signal is delivered to solenoid 38, and pen 10 is lifted from the surface of paper 29.

Thus the path of pen 10 in writing a signature is recorded in tape recorder 62 and played back when it is desired to reproduce the signature. It will be apparent that notes, memoranda, and letters can also be reproduced using a machine constructed in accordance with this invention, the size of the document being limited only by the pen support mechanism of FIG. 1, which can be extended to accommodate different sizes of letters and notes.

When a large number of documents are to be signed or reproduced using a machine in accordance with this invention, the tape may be driven back and forth such that successive signatures are written in forward and reverse directions. Furthermore, to reproduce the normal variation inherent in writing a signature, a single signature may be recorded several times, and the varying signatures may be reproduced in succession.

In a general manner, while there has been disclosed an effective and efficient embodiment of the invention, it should be well understood that the invention is not limited to such an embodiment as there might be changes made in the arrangement, disposition, and form of the parts without departing from the principle of the present invention as comprehended within the scope of the accompanying claims.

I claim:

1. A handwriting reproducing machine comprising a writing element; a writing surface; support means for holding said element and for mechanically indicating the position of said element, said indication being in the form of first and second coordinates; first and second conversion means for converting said first and second coordinates into first and second DC voltages, respectively; first and second voltage-to-frequency converters for converting said first and second DC voltages into first and second AC signals, respectively, the frequency of said first and second AC signals being related to the magnitude of said first and second DC voltages, respectively recording means having first and second channels for recording and reproducing said first and second AC signals; first and second demodulation means associated with said first and second channels for converting said first and second AC signals into first and second reproduce DC voltages, respectively; first comparison means associated with said first conversion means for comparing said first DC voltage with said first reproduce DC voltage; second comparison means associated with said second conversion means for comparing said second DC voltage with said second reproduce DC voltage; first and second motive means connected to said first and second comparison means and mechanically linked to drive said support means.

2. A machine as in claim 1 wherein said support means comprises first and second shafts, the angular orientation of said first and second shafts indicating said first and second coordinates, respectively.

3. A machine as in claim 2 wherein said first and second conversion means comprise first and second potentiometers mounted on said first and second shafts, respectively, and wherein said first and second motive means comprise first and second servo motors mounted on said first and second shafts, respectively.

4. A machine as in claim 3 wherein said first and second comparison means comprise first and second differential amplifiers, respectively, said first differential amplifier having a first input connected to said first potentiometer and a second input connected to said first demodulation means and said second differential amplifier having a first input connected to said second potentiometer and a second input connected to said second demodulation means.

5. A machine as in claim 4 wherein the outputs of said first and second differential amplifiers are connected to said first and second servo motors, respectively.

6. A machine as in claim 5 wherein said recording means comprises a magnetic tape recorder having a first record and a first reproduce terminal in said first channel and a second record and a second reproduce terminal in said second channel.

7. A machine as in claim 6 wherein said first demodulation unit comprises a first buffer amplifier, a first Schmitt trigger, a first one shot multivibrator, and a first integrator, connected in series; and wherein said second demodulation unit comprises a second buffer amplifier, a second Schmitt trigger, a second one shot multivibrator, and a second integrator, connected in series, said first and second buffer amplifiers being connected to said first and second reproduce terminals, respectively.

8. A machine as in claim 7 wherein said support means comprises means for lifting said writing element from said writing surface, and additionally comprising lift sensing means for sensing whether said writing element is in contact with said surface, said lift sensing means being connected to said second record channel.

9. A machine as in claim 8 comprising activation means for lifting and lowering said writing element with respect to said writing surface and first and second filters, said first filter being connected between said second reproduce terminal and said activation means and said second filter being connected between said second reproduce terminal and said second demodulation means.

* * * * *